June 21, 1949.                      D. T. CAST                      2,473,569
                    PORTABLE HEAT-ADJUSTING CHARCOAL STOVE
Filed Aug. 18, 1947                                        2 Sheets-Sheet 2
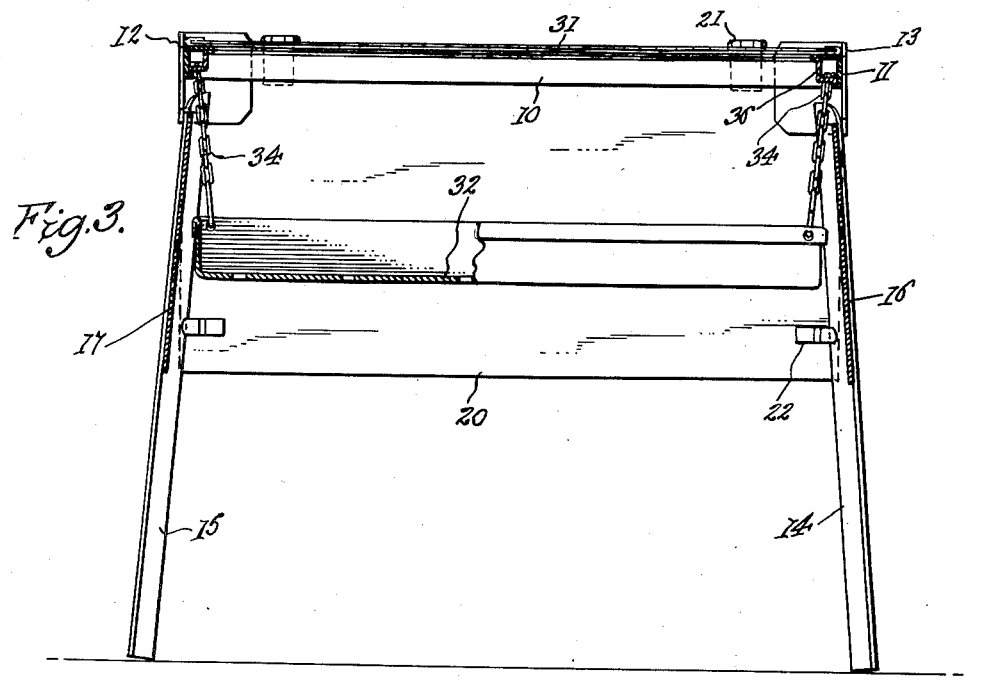
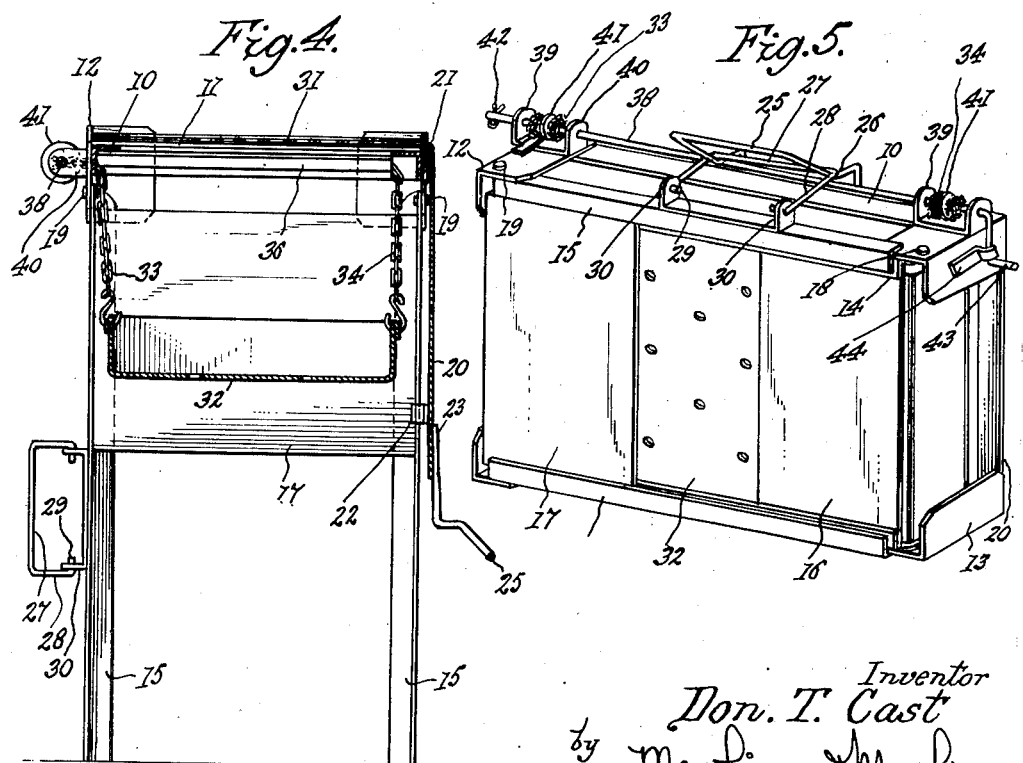
Inventor
Don. T. Cast
by Mawhinney & Mawhinney
Attorneys Patented June 21, 1949

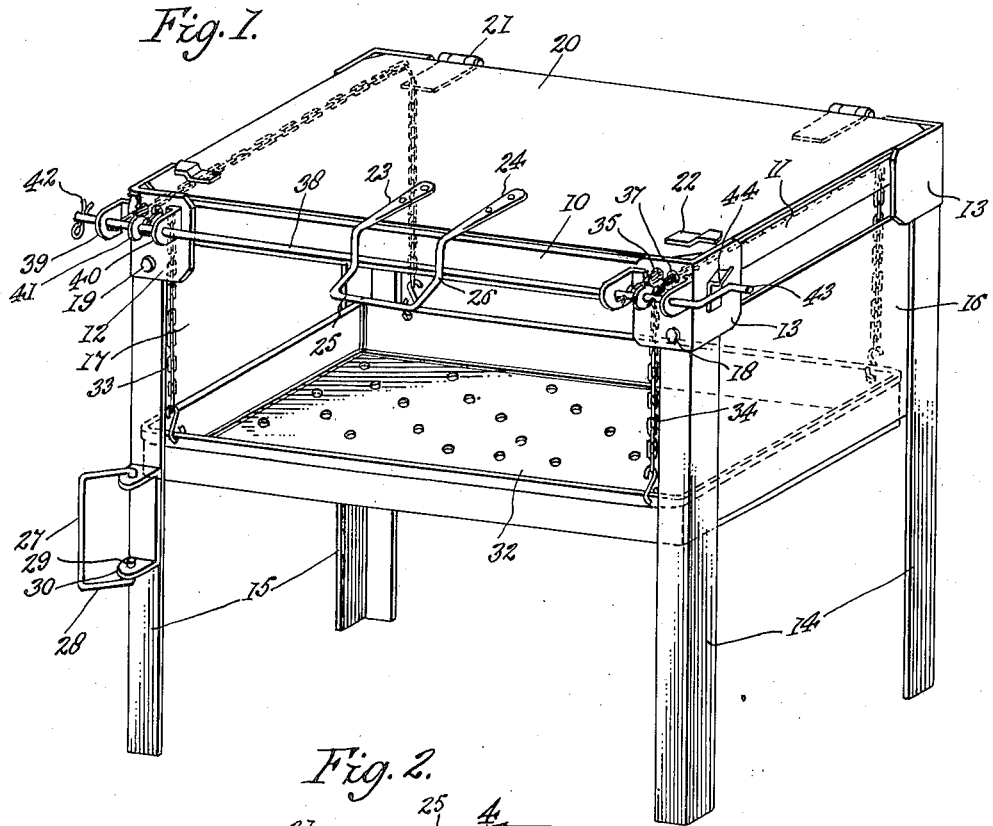

2,473,569

UNITED STATES PATENT OFFICE 2,473,569

PORTABLE HEAT-ADJUSTING CHARCOAL STOVE

Don T. Cast, Columbus, Ohio

Application August 18, 1947, Serial No. 769,186

5 Claims. (Cl. 126—9)

The present invention relates to improvements in portable heat-adjusting charcoal stove, and has for an object to provide a camping or portable stove adapted to be folded in small compass somewhat imitating a suit-case for convenience in transporting the same, and in which provision is made for raising and lowering the fuel pan to various heights or distances from the grill or hot plate whereby the cooking temperature at such grill or hot plate may be influenced.

Another object of the invention is to provide an improved stove having a grill or hot plate with a fuel pan therebelow supported for vertical adjustment on chains or suitable flexible connections which wind about sections of a shaft supported on the frame of the stove and adapted for rotation whereby to wind or unwind such chains in the act of raising or lowering the fuel pan, and in which a latch is arranged for the crank handle of the shaft to maintain the fuel pan in adjusted position.

A further object of the invention resides in providing an improved stove of a foldable character having legs mounted in pairs pivotally mounted upon the frame of the stove and adapted to fold longitudinally one set of legs within the other, and wherein the pairs of legs are flexibly connected to one another with keepers for the rear legs mounted upon the hot plate in such position that the rear legs must be sprung outwardly into downwardly divergent relation before they may be sprung into the keepers for the purpose of retaining the stove with greater stability upon the stone floor of a patio or upon any other hard smooth floor.

A still further object of the invention is to provide an improved foldable stove in which the hot plate is hinged to fold down in the rear part of the stove to form an apron or windshield cooperating with side aprons or shield of resilient metal which connect the pairs of legs and permit the relative movement of the legs as described in the immediately preceding paragraphs.

With the foregoing and other objects in view, the invention will be more fully described hereinafter and more particularly pointed out in the appended claims.

In the drawings, in which like parts are denoted by the same reference characters throughout the several views, Figure 1 is a perspective view of an improved portable heat-adjusting charcoal stove as constructed in accordance with the present invention and illustrated in the set-up position.

Figure 2 is a top plan view of the same with the hot plate elevated and partly broken away and with a portion of one of the transverse bars also broken away.

Figure 3 is a vertical longitudinal section taken on the line 3—3 in Figure 2.

Figure 4 is a transverse central sectional view taken on the line 4—4 in Figure 2, and Figure 5 is a perspective view of the device folded for carrying and transportation.

Referring more particularly to the drawings 10 and 11 represent longitudinal and transverse bars respectively which are joined by welding or otherwise into an open rectangular frame. The bars are preferably angle iron in cross section with their horizontal webs disposed uppermost in order to form supports for the grill and for the hot plate as hereinafter described.

The frame is welded or otherwise connected to resilient corner pieces which comprise the longitudinal webs 12 extending in front and in back of the stove and the transverse or lateral webs 13 which lie at the ends of the stove.

The stove is supported upon pairs of legs 14 and 15. Each pair of legs is at an end of the stove and is preferably made from angle iron construction.

The pair of legs 14 at one end of the stove are flexibly connected together by an apron or shield 16 of sheet metal which possesses a sufficient degree of the inherent flexibility and elasticity to permit of relative movement of the legs 14 in a longitudinal direction.

Similarly the other pair of legs 15 at the other end of the stove carry an apron or shield 17 of a flexible or resilient nature welded or otherwise secured to the inside surfaces of the transverse webs of such legs 15. These aprons or shields 16 and 17 are connected to the upper portions of their respective pairs of legs 14 and 15 but open areas are left between the upper edges of these aprons and the lower edges of the vertical webs of the transverse bars 11.

The legs 14 and 15 are pivoted at 18 and 19 in the lower outer portions of the longitudinal webs 12. The pairs of legs thus swing longitudinally of the stove one within the other when the fuel pan is raised.

A combined hot plate and shield 20 is hinged at 21 to the rear longitudinal bar 10 and carries on its upper face the keepers or catches 22.

This hot plate also carries a handle member which comprises arms 23 and 24, a cross bar 25 and offsets 26. The handle cooperates with a swinging bail or handle 27 carried by the front leg 15. The swinging bail is carried by arms 28 which have inturned trunnions 29 mounted in perforated lugs 30 carried by such front leg 15 on its front web.

An open grill plate 31 is adapted to rest in the open rectangular frame 10, 11 and to rest upon the upper horizontal flanges of the bars 10 and 11. The hot plate 20 may also rest upon such flanges of the rectangular frame or may rest upon the grill plate 31 if desired.

It will be noted that the corner pieces 12, 13 upstand from the horizontal flanges of the bars 10 and 11 and thus also act as corner retaining pieces for the grill plate 31 and hot plate 20.

A preferably flanged and perforated fuel pan 32 adapted to contain the burning charcoal or other fuel is slidably mounted between the legs 14 and 15 with the corner portions of the pan received in the elbows of the angle iron legs. Such pan is adapted to move up and down vertically, being guided by the legs 14 and 15. Front and rear chains 33 and 34 are fixed to corner portions of the pan 32. The front chains 33 are directed at their upper ends outwardly through perforations 35 made in the front corner piece webs 12. The rear chains 34 rise vertically upwardly and then pass through casings 36 formed within the transverse bars 11; thence the chains pass outwardly through perforations 37 in the front webs 12 of the corner pieces. The ends of all four chains are secured to and wound about sections of a shaft 38 which is journaled for rotation in bearing ears or lugs 39, 40 carried upon the front webs 12 of the corner pieces. Partitions 41 on the shaft 38 divide the sections of the shaft receiving the various chains. The shaft is fitted for axial or longitudinal sliding movement in its bearing ears or lugs 39, 40 and is secured at one end against removal by a detachable cotter pin 42. The other end of the shaft carries a crank handle 43 for retaining the shaft and also for engaging a shelf or support 44 projecting out from the adjacent transverse web 13 of the front corner piece.

In the use of the device the set-up position of the stove is shown in Figure 1 with the legs 14 and 15 folded down so as to support the frame 10, 11 in an elevated position with the grill 31 and hot plate 20 thereabove and a fuel pan 32 below. Access to the fuel pan is had between the front legs 14 and 15 as there is no shield at this point. The fire is kept in the pan by means of ordinary charcoal or other desired fuel and the aprons 16 and 17 act as shields particularly in high winds. By rotating the hot plate 20 about the hinges 21 it may also be folded down vertically at the back of the stove and thus act as a further shield. The open area between the shields 16 and 17 and the transverse bars 11 will permit of the lateral escape of smoke and other products of combustion which it might be found desirable to eliminate.

The grill 31 is simply laid upon the top open rectangular frame and it is prevented from horizontal displacement by the upstanding parts of the corner pieces 13, 14. It may be lifted out at any time. However, this will not be necessary even when the hot plate is used as for instance in cooking frankfurters and the like.

At any time by rotation of the crank 43 the fuel pan 32 may be raised or lowered to alter its distance from the grill 31 and hot plate 20. In this way the effect of the fire at the point of cooking may be adjusted immediately and that adjustment may be preserved by shifting the shaft 38 axially until the crank arm 43 engages the shelf or keeper 44. Thus the keeper 44 will prevent clockwise rotation of the shaft and the unwinding of the chains. When it is desired to rotate the shaft 38 such shaft is moved axially by the crank 43. For instance the crank is pulled outwardly to free it from the path of the shelf or keeper 44.

It will be noted that the casings 36 provide convenient guides for the rear chains. Such casings permit the rear chains to rise in direct vertical lines from the rear parts of the pan and then turn and traverse forward horizontal directions through the casings 36 which are in alignment with the openings 37. Thus all chains may have freedom of movement while connected in the simplest and most effective manner to lift and permit lowering of the pan.

Now it will be noted particularly from Figure 3 that the rear legs of the stove are disposed in a downwardly divergent relative arrangement. The relative positions of the keepers 22 carried by the hot plate 20 are responsible in that the rear stove legs must be pulled out longitudinally to the inclined position in order that their longitudinal flanges may snap over the catches 22. The catches 22 are so spaced apart on the hot plate 20 that they will maintain the rear legs in this divergent relation which is desirable for supporting the stove with greater stability upon stone or other hard smooth floors found for instance in patios. Where the stove is placed upon the turf, it will not be necessary to separate the legs in this fashion as the lower end of the angle iron legs which are reasonably thin will penetrate the ground or secure a good grip thereon such as will hold the legs against collapse or relative movement and preserve the stability of the entire structure.

In folding the stove the crank 43 is first rotated to elevate the fuel pan 32. The legs 14 are then together folded upwardly and it will be noted that the angle iron construction enables the flanges of the legs 14 to nest very closely against the bottom and longitudinal flanges of the pan. Next the legs 15 are folded together beneath the legs 14 and in a similar manner these legs nest together in a manner indicated in Figure 5. When the stove is thus folded the swinging bail 27 will be in proximity to the handle 25 or it may be swung over the handle 25 so as to form a lock which will prevent the legs from casual opening while the stove is being carried somewhat after the manner of a suit-case.

While I have disclosed herein the best form of the invention known to me at the present time, I desire it to be understood that I reserve the right to make changes and modifications in the herein described embodiment of the invention provided such changes fall within the scope of the following claims.

What is claimed is:

1. A portable heat adjusting charcoal stove comprising a frame, corner pieces attached to said frame, pairs of legs pivoted to said corner pieces and adapted to fold beneath the frame one pair within the other, a vertically adjustable fuel pan slidably mounted beneath said frame and adapted to be moved upwardly thereagainst prior to the infolding of said pairs of legs; a top plate hinged to said frame at its rear edge and having a handle extending from its forward edge, said handle having a cross-bar and angularly offset portions, and a second cooperating handle swivelly carried by one of the legs of the last mentioned folded pair of legs adapted to be swung over the first mentioned handle and seat behind said angularly offset portions when said last mentioned pair of legs is folded whereby the stove as a compact unit may be carried by one handle.

2. A portable heat adjusting charcoal stove comprising a frame, corner pieces attached to said frame, pairs of legs pivoted to said corner pieces and adapted to fold beneath said frame one pair within the other, a vertically adjustable fuel pan slidably mounted beneath said frame and adapted to be moved upwardly thereagainst before the infolding of the pairs of legs, flexible connections for supporting said fuel pan, a shaft having sections upon which said flexible connections are wound, bearing supports on said frame for rotatably receiving said shaft, a handle for rotating said shaft, stationary retaining means carried by said frame for holding said shaft in adjusted position in its innermost axial position, a top plate hinged to said frame at its rear edge and having a handle extending from its forward edge, said handle having a cross-bar and angularly offset portions, and a second cooperating handle swivelly carried by one of the legs of the last mentioned folded pair of legs adapted to be brought into proximity to the first mentioned handle when the legs are folded and swung thereover to seat behind said angularly offset portions to retain the stove in a single compact unit.

3. A portable heat adjusting charcoal stove comprising a rectangular stove frame, corner pieces attached to said frame, pairs of legs pivoted to said corner pieces and adapted to fold beneath the frame one pair within the other, flexible aprons connecting the pairs of legs, a top plate hinged to said frame at its rear edge, clips carried by said top plate proximate its forward and side edges thereof adapted to clip over a portion of the rear legs of said pairs of legs whereby said rear leg of each pair of legs is retained outwardly irrespective of its companion leg with the outwardly swung legs downwardly divergent with relation to one another when said top plate is swung to the rear of said frame, a fuel pan movable up and down between said legs, flexible connections for supporting said fuel pan, a shaft having sections upon which said flexible connections are wound, bearing supports on said frame for rotatably receiving said shaft, means for rotating the shaft, and means for holding said shaft in adjusted position.

4. A portable heat adjusting charcoal stove as claimed in claim 2 characterized by the fact that said legs are constructed of angle iron with their flanges so disposed as to confine the fuel pan.

5. A portable heat-adjusting charcoal stove comprising a stove top, pairs of legs pivoted to said stove top for supporting said stove top and being foldable one pair within the other, a fuel pan movable up and down between said legs, flexible connections for supporting said fuel pan, a shaft having sections upon which said flexible connections are wound, bearing supports on the stove for rotatably receiving said shaft, said shaft being slidable axially through said bearing supports, a crank handle for rotating said shaft, a stationary keeper supported by said stove in position to be engaged by said crank handle when said shaft is shifted axially in one direction, and casings carried by the stove top along the side edges thereof through which certain of the flexible connections move on their way from the pan to the shaft.

DON T. CAST.

REFERENCES CITED

The following references are of record in the file of this patent:

UNITED STATES PATENTS

| Number | Name | Date |
| --- | --- | --- |
| D. 142,866 | Johannsen | Nov. 13, 1945 |
| 250,961 | Parker | Dec. 13, 1881 |
| 1,421,393 | Boyle | July 4, 1922 |
| 1,438,345 | Tait | Dec. 12, 1922 |
| 1,540,434 | Stone | June 2, 1925 |
| 1,566,504 | Pearsall | Dec. 22, 1925 |
| 1,709,289 | Tatum | Apr. 16, 1929 |
| 2,152,168 | Anderson | Mar. 28, 1939 |